No. 665,232. Patented Jan. 1, 1901.
P. KOSSOV & W. WISCHEW.
LOCK.
(Application filed Dec. 28, 1898.)
(No Model.) 6 Sheets—Sheet 2.

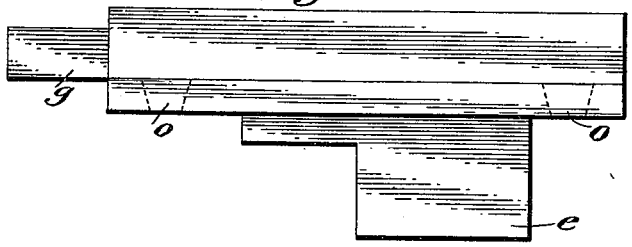
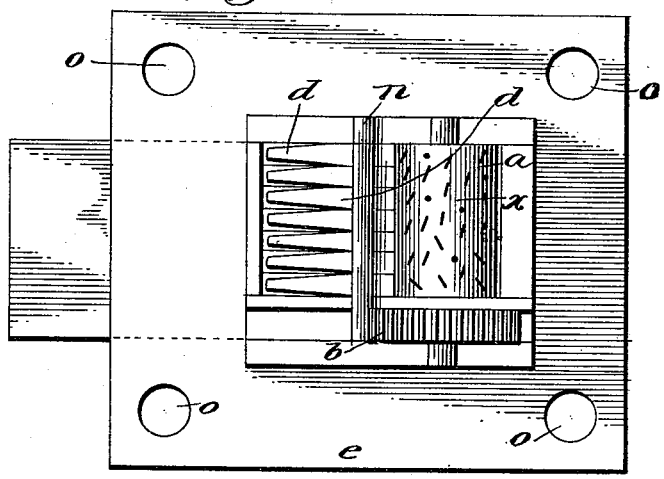
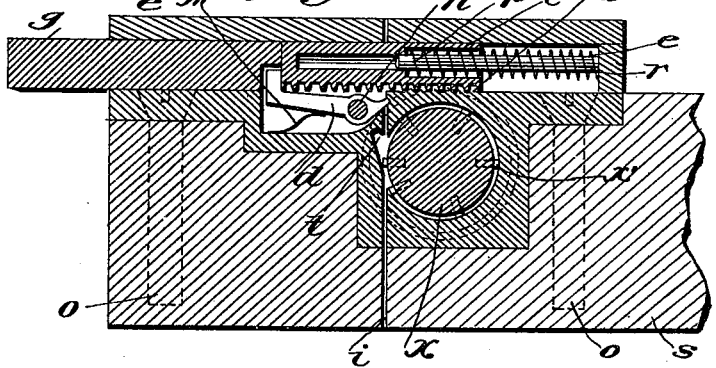

WITNESSES
A. B. Diggs
Jas. A. Richmond

INVENTORS
Peter Kossov and
Wassily Wischew
by G. Dithmer
Attorney

No. 665,232. Patented Jan. 1, 1901.
P. KOSSOV & W. WISCHEW.
LOCK.
(Application filed Dec. 28, 1898.)

(No Model.) 6 Sheets—Sheet 3.

WITNESSES
A. B. Deggs
Jas. H. Richmond

INVENTORS
Peter Kossov and
Wassily Wischew
by G. Dittmar
Attorney

No. 665,232. Patented Jan. 1, 1901.
P. KOSSOV & W. WISCHEW.
LOCK.
(Application filed Dec. 28, 1898.)
(No Model.) 6 Sheets—Sheet 4.

WITNESSES
A. B. Driggs
Jas. A. Richmond

INVENTORS
Peter Kossov and
Wassily Wischew
by G. Dittmar
Attorney

No. 665,232. Patented Jan. 1, 1901.
P. KOSSOV & W. WISCHEW.
LOCK.
(Application filed Dec. 28, 1898.)
(No Model.) 6 Sheets—Sheet 5.

WITNESSES
A. B. Driggs
Jas. A. Richmond

INVENTORS
Peter Kossov and
Wassily Wischew
by G. Dittmar
Attorney

No. 665,232.   Patented Jan. 1, 1901.
P. KOSSOV & W. WISCHEW.
LOCK.
(Application filed Dec. 28, 1898.)

(No Model.)  6 Sheets—Sheet 6.

WITNESSES
A. B. Degges
Jas. T. Richmond.

INVENTORS
Peter Kossov and
Wassily Wischew
by G. Ditmar
Attorney

THE NORRIS PETERS CO., PHOTO-LITHO., WASHINGTON, D. C.

UNITED STATES PATENT OFFICE.

PETER KOSSOV AND WASSILY WISCHEW, OF ST. PETERSBURG, RUSSIA.

LOCK.

SPECIFICATION forming part of Letters Patent No. 665,232, dated January 1, 1901.

Application filed December 28, 1898. Serial No. 700,529. (No model.)

*To all whom it may concern:*

Be it known that we, PETER KOSSOV and WASSILY WISCHEW, subjects of the Emperor of Russia, and residents of St. Petersburg, Russia, have invented certain new and useful Improvements in Safety-Locks, of which the following is a specification.

Our invention relates to safety locks and latches.

It consists in certain novel features of construction in the parts of a lock, also the arrangement and combination of the same, and, further, in the adaptation of a key or keys essentially coacting with the lock.

It further consists in certain other novel features hereinafter enumerated, and particularly pointed out in the claims hereto appended.

Figure 4:
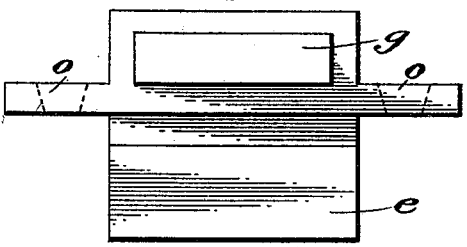
Figure 5:
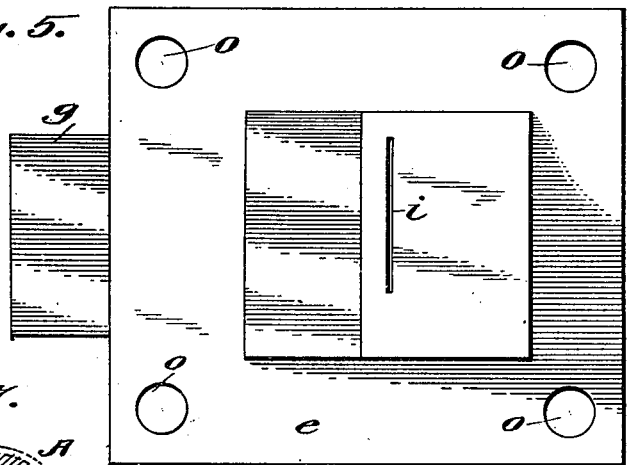
Figure 7:
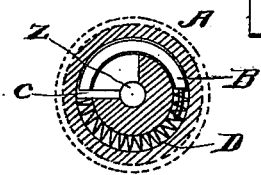
Figure 6:
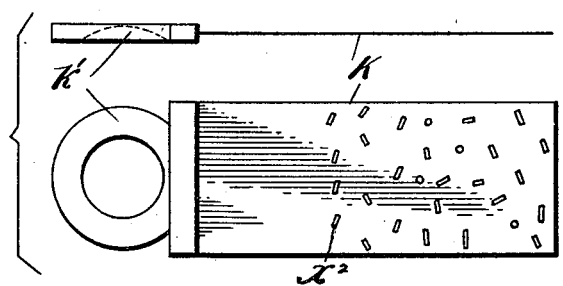
Figure 8:
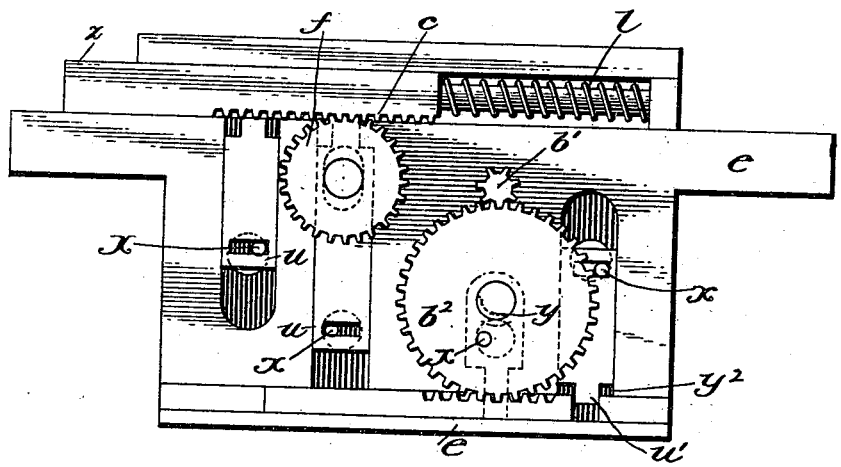
Figure 11:
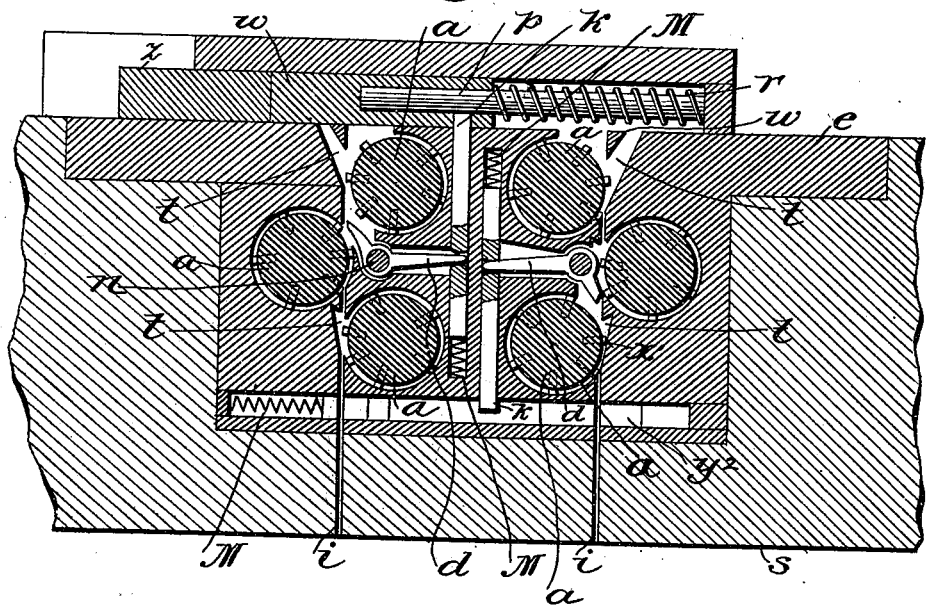
Figure 9:
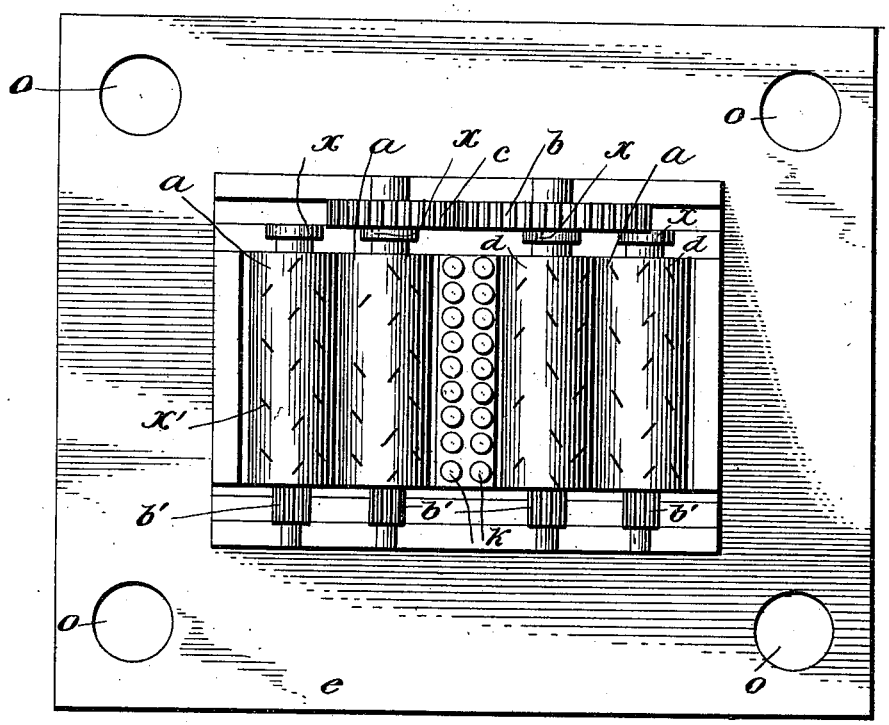
Figure 10:
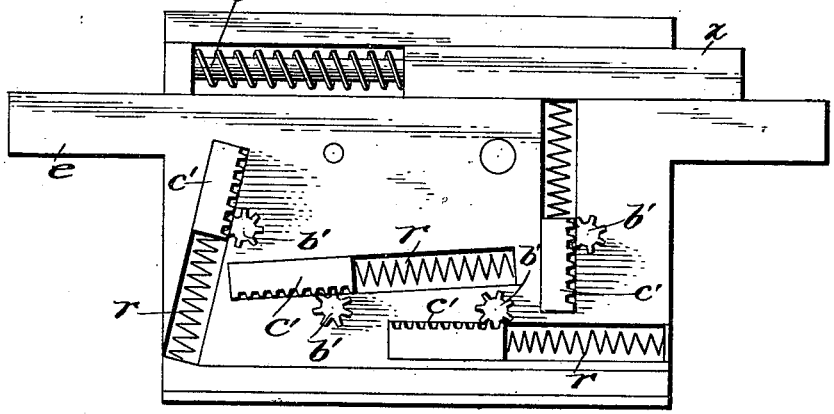
Figure 12:
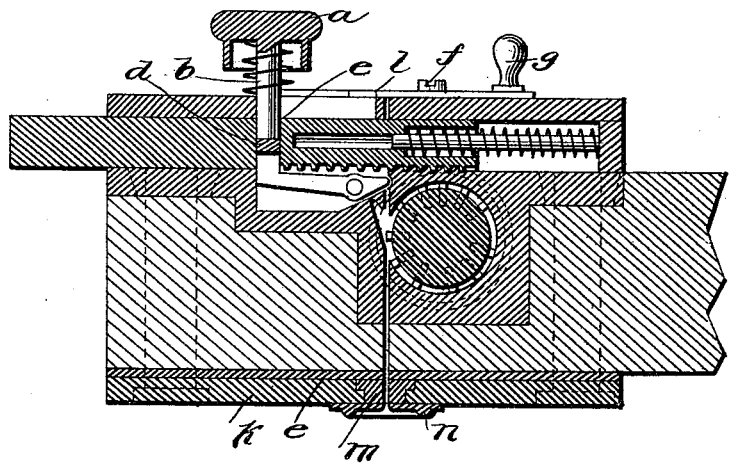
Figure 13:
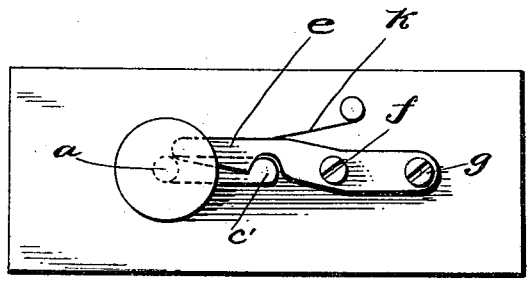
Figure 14:
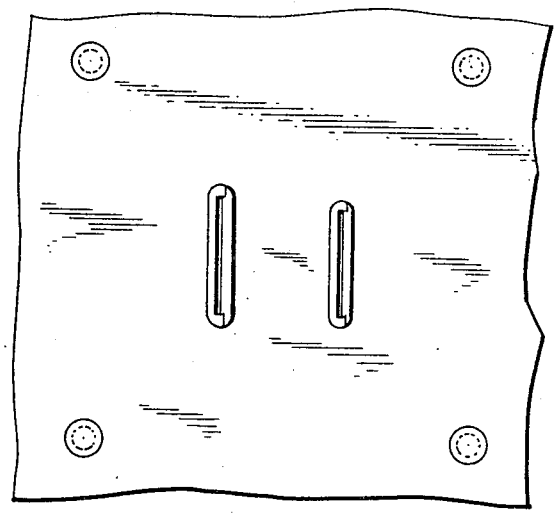
Figure 15:
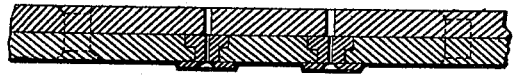

Reference being had to the drawings accompanying and forming part of this specification, Figures 1 to 7 illustrate, as an example, one of the forms of lock our invention may assume, a lock having a rotative cylinder provided circumferentially with pins or projections, as presently to be described. Fig. 1 is a side view thereof. Fig. 2 is a front view. Fig. 3 is a cross-section. Fig. 4 is an end view. Fig. 5 is a rear view of the lock. Fig. 6 shows side and end views of the key. Fig. 7 is a section of the pinion on the axle of the cylinder. Fig. 8 is a side view of a modified form of the lock. Fig. 9 is a front view thereof. Fig. 10 is a view of the opposite side of the lock. Fig. 11 is a section through the lock. Fig. 12 is a transverse section of a modification. Fig. 13 is an end view showing the removable head or button $b$ and the retaining-levers; and Figs. 14 and 15 illustrate, respectively, an elevation and a cross-section of the casing, showing the key-slots.

Referring to Figs. 1 to 7, $e$ shows a lock-casing provided with the usual means, such as screw-holes $o$, for attachment to a door. Said casing carries a rotative cylinder $a$ and locking-bolt $g$, having a rack $c$, as presently described. $d$ designates a series of levers, fulcrumed as at $m$ and having lateral arms or extensions normally pressed into corresponding notches in the locking-bolt by springs M. The locking-bolt $g$ is slidably mounted in the usual manner in the casing and has a bore $p$ to receive a spindle $l$ and a seat for the coiled spring $r$, surrounding said spindle. The casing and door S are provided with a slot $i$ at one side of the cylinder $a$, which is adapted to guide a suitable key directly against the cylinder, the continuity of the slot being broken only by the falseway $t$. The cylinder $a$ has a plurality of radial studs or extensions diversely formed, and one of its axles or hubs carries a pinion $b$, provided with gear-teeth A, which mesh with the racks $c$. Said pinion has an annular recess wherein are provided a semicircular rod B and a spiral spring D to actuate the same.

To actuate the lock, the key $k$, Fig. 6, which has its surface provided with slots corresponding to the arrangement of the studs of cylinder $a$, is inserted in the slot $i$ of the door in a determinate position, with the thumb of the hand resting in the recess $k'$. The end of the key enters in the lock-casing through the slot $i$, which corresponds exactly to the width and thickness of the key and which is cut in a well-tempered steel portion of the casing $e$. The key being thrust deeper bears on the studs $x$ of cylinder $a$ and causes the latter to turn, the studs meanwhile entering the corresponding holes $x^2$ of the key. By going deeper the key passes by the falseway $t$ until it strikes the lever $d$, while the pinion remains still motionless by reason of the cut-out Z, as will be explained hereinafter. The key being thrust deeper, the levers $d$ rock on their pivots, and their long hooked arms disengage from the lock-bolt $g$. The pinion A turns simultaneously, and the lock-bolt, being drawn by the gear, slides into the interior of the lock. By withdrawing the key all the movements are repeated in the inverse order and the device is locked. While the cylinder $a$ turns, the pin C, Fig. 7, bears on the curved member B and pushes it into the pinion until the pin reaches the end of the cut-out Z. By the inverse motion the spring D bears on the rod B, which in turn pushes the pin C, and thus returns the cylinder to its original position. In the event that the size and disposition of the holes $x^2$ of the key do not correspond with the studs on cylinder $a$ the key would be diverted into the falseway $t$ and would be unable to actuate the levers $d$.

In the construction shown in Figs. 8 to 11 we employ several cylinders $a$, operating on the same principle of the lock just described. In this modified lock, however, two keys are employed. In said figures, $e$ designates the casing of the lock; Z, the lock-bolt, having a rack $c$; $l$, the latch engaging the lock-bolt; $a$, the cylinders; C, toothed wheel on the axes of cylinders $a$. $y$ is a notch on the shaft of the third cylinder $a$. $x\,x$ designate cams on the axles of the cylinders $a$. $u\,u$ are latches engaging the lock-bolt Z. $u'$ is a latch engaging the slides $y^2$; $b'$, pinions carried on the shaft of cylinder $a$; $b$, toothed wheels secured on the axles of cylinders $a$. $b^2$ is a toothed wheel revolubly mounted on the wall of the casing $c$. $s$ designates that part of the door to which the lock is attached. $k\,k$ are rods. $i\,i$ are key-slots. $d\,d$ are levers pivoted at $n\,n$ for actuating rods $k\,k$. $t\,t$ are falseways for the keys. $x'$ are studs on the cylinders $a$. $r\,m\,m$ are springs bearing, respectively, on slides $y^2$, rods $k\,k$, and lock-bolt Z. This lock operates as follows: To actuate the lock, one of the keys, held as before indicated, is inserted through the door S in the free slot $i$ of the lock. The extremity of the key entering into the mechanism of the lock bears on the studs of the first cylinder $a$. The further entrance of the key causes the first cylinder to turn, while the radial studs of this cylinder enter consecutively in the corresponding holes of the key, which slides by the falseway $t$ and moves the levers $d$, causing the latter to release the rods $k\,k$ from the slide $y^2$. The extremity of the key now bears on the pins of the second cylinder, which, pressed by the key, turns on its axis, while its pins engage the holes of the key, which passes by the second falseway and bears on the pins of the third cylinder. At the same time the latch $u$ also disengages from the slide $y^2$. The key being inserted deeper, the third cylinder turns on its axis, and its pins engage also the corresponding holes of the key. The slide $y^2$, actuated by the pinion $b'$, Fig. 8, and by the toothed wheel $b^2$, is drawn aside and opens the second slot $i$. The first key then remains in the lock, and the second key is inserted in the second slot $i$. This key is pushed analogically, as the first one, until it bears on the third cylinder, which latter causes the levers $d$ to move, while the rods $k$ and the latch $u$ are withdrawn and release the lock-bolt Z. The key continuing to advance, the third cylinder turns on its axis, its pins enter into the corresponding holes of the key, and the toothed wheel $b$ is caused to enter the lock-bolt in the lock, which is then unlocked. When the key is withdrawn, the same movements take place in the inverse order and the lock is closed.

Figs. 12 to 15 show a further modification of the lock with rotating cylinder, which may be closed or opened from the side opposed to the key-slot by means of a handle or button. This lock is in every way similar to the lock shown in Figs. 1 to 7 with this difference, that it is provided on the opposed side with a movable head or button $a$, secured on a spindle. The transversal interior head $d$ of this spindle bears on the levers, whose hooked ends retain the lock-bolt. When the button $a$ is pressed, the cross-head $d$ causes the levers to rock in the same manner as when these levers are actuated by the key, as before explained. The button $a$ is then pushed aside, its spindle sliding in a slot provided in the cover-plate $c$ of the casing and entering into a notch cut in the latch $e$, pivoted at $f$ and pressed by a flat spring H. In this way the lock-bolt is drawn into the lock, where it is retained by the notch of the latch. To close the lock, it is sufficient to press down the button $g$ of the latch $e$, and the lock-bolt, pushed out by its spring, is drawn out.

Having thus described our invention, we claim—

1. In a lock as described the combination of a spring-latch having a rack-surface, and a recess on one of its sides, a pivoted tumbler adapted to engage in said recess, a rotative cylinder with diversely-formed extensions radiating from its surface, a key-slot extending to the rear arm of the tumbler and separated by a falseway, a toothed wheel borne upon the hub of said cylinder adapted to mesh with said rack and to retract the latch-bolt when the cylinder is actuated by the thrust action of a proper key with means for returning said elements to their normal position, substantially as described.

2. In a lock as described the combination of a spring-latch having a rack-surface and a recess on one of its sides, a spring-pressed pivoted tumbler adapted to engage said recess, a rotative cylinder bearing a plurality of radial and diversely-formed extensions, a key-slot extending to the arm of the tumbler and separated by a falseway, a toothed wheel borne upon the hub of said cylinder, adapted to mesh with said rack and to retract the latch-bolt when the cylinder is actuated by the thrust action of a proper key, the key, said key having openings stamped in the same, corresponding to the diversely-formed extensions of the cylinder and adapted to engage therewith, a circular groove in the end of the cylinder, a semicircular member therein, a pin bearing against said member and having a limited movement and a spring impinging against said pin and curved member and adapted to return the cylinder to its normal position on the removal of the key, substantially as described.

3. In a lock as described, the combination of a spring-latch having a rack-surface and a recess on one of its sides, a sliding bolt at the opposite side of the lock, a plurality of rotative cylinders having diversely-formed extensions radiating from their curved surfaces, two key-slots, one of said slots normally closed by said sliding bolt, falseways located in said key-slots, duplicate keys, said keys having openings stamped in the same corresponding to the diversely-formed extensions of the cylinders and mechanism actuated by the first cylinder under the thrust action of a proper key, whereby the second key-slot is opened and the latch retracted on the entrance in said key-slot of a proper key, substantially as described.

4. In a lock as described, the combination of a latch-bolt having a rack-surface and a bore at its rear extremity, a spindle received therein, a spring borne upon said spindle and impinging against the latch-bolt and lock-casing, a pivoted tumbler engaging a recess in said bolt, and a spring-bolt adapted to release said tumbler by pressure upon the same; a rotative cylinder bearing a plurality of radial and diversely-formed extensions, a key-slot extending to and separated from the arm of the tumbler by a falseway, a toothed wheel borne upon the hub of said cylinder, adapted to mesh with said rack and to retract the latch-bolt when the cylinder is actuated by the thrust action of a proper key, the key, said key, having openings stamped in the same, corresponding to the diversely-formed extensions of the cylinder and adapted to engage therewith and means for returning said parts to their normal position substantially as described.

In witness whereof we have hereunto set our hands in presence of two witnesses.

PETER KOSSOV.
WASSILY WISCHEW.

Witnesses:
N. TSCHEKALOFF,
J. BLAU.